(12) United States Patent
Miri

(10) Patent No.: US 7,383,547 B1
(45) Date of Patent: Jun. 3, 2008

(54) APPARATUS AND TECHNIQUE FOR DEVICE EMULATION

(75) Inventor: Ali Miri, San Jose, CA (US)

(73) Assignee: LeCroy Corporation, Chestnut Ridge, NY (US)

( * ) Notice: Subject to any disclaimer, the term of this patent is extended or adjusted under 35 U.S.C. 154(b) by 342 days.

(21) Appl. No.: 11/004,700

(22) Filed: Dec. 3, 2004

(51) Int. Cl.
G06F 9/46 (2006.01)
G06F 3/00 (2006.01)
G06F 9/455 (2006.01)

(52) U.S. Cl. .......................... 718/100; 710/8; 710/15; 703/23

(58) Field of Classification Search .................. 703/23, 703/15; 714/741; 364/900; 710/8, 15; 718/100
See application file for complete search history.

(56) References Cited

U.S. PATENT DOCUMENTS

| | | | | |
|---|---|---|---|---|
| 4,907,192 A | * | 3/1990 | Kaneko | 712/236 |
| 5,913,052 A | * | 6/1999 | Beatty et al. | 703/15 |
| 6,442,725 B1 | * | 8/2002 | Schipke et al. | 714/741 |
| 6,636,929 B1 | * | 10/2003 | Frantz et al. | 710/313 |
| 2005/0129040 A1 | * | 6/2005 | Kiel et al. | 370/412 |

* cited by examiner

Primary Examiner—Meng-Ai An
Assistant Examiner—Eric C Wai
(74) Attorney, Agent, or Firm—Gordon Kessler

(57) ABSTRACT

A device emulator configured to emulate an electronic device to test a computing device. The device emulator includes a plurality of read-write registers that are user configurable to include a set of read registers and a set of write registers, wherein the set of write registers are configured to receive a plurality of requests from the computing device, and wherein the set of read registers are configured to transfer one or more conditional responses of a plurality of conditional responses to the computing device based on the requests; a set of control logic configured to receive the requests from the set of write registers and transfer the conditional responses to the set of read registers; and a circuit device that includes the read-write registers and the set of control logic, wherein the circuit device is configured to operate the control logic to emulate the electronic device.

40 Claims, 7 Drawing Sheets

APPARATUS AND TECHNIQUE FOR DEVICE EMULATION

BACKGROUND OF THE INVENTION

The present invention relates to apparatus and technique for testing systems, and more particularly relates to a device emulator that is configured to emulate an electronic device and operate in conjunction with a computing device to test the computing device.

To provide consumers with reliable electronic products, the manufacturers of electronic products typically test the electronic products prior to sale. Tests of electronic products are performed at a variety of development stages and manufacturing stages of the electronic products. For example, functional tests and parametric tests might be performed on the individual integrated circuit chips and their associated packaging prior to sale of the chips to a manufacturer that will use the chips in an electronic product. Prior to selling the electronic product to a consumer, the manufacturer of the product also typically tests the product to ensure proper functionality of the product. Further, if an electronic product is configured to operatively interact with another electronic device, such as a computing device, the manufacturer of the electronic product might also test a number of computing devices manufactured by a number of manufacturers to determine whether their electronic product is operable with the computing devices. Similarly, a manufacturer of a computing device might test their computing device to determine whether the computing device is operable with a variety of peripheral electronic devices.

Testing the operability of a variety of electronic devices with a variety of computing devices tends to be cost prohibitive as the cost of obtaining a variety of computing devices and/or a variety of electronic devices is relatively large. Therefore, manufacturers of electronic devices have turned to emulating the varieties of computing devices with which their electronic devices are configured to interactively operate, and manufactures of computing devices have also turned to emulating the electronic devices with which their computing devices are configured to interactively operate. As new technology develops, new emulators are needed to emulate the new technology and/or the devices with which the new technology is configured to interactively operate. For example, as new technologies are developed, the manufacturers of these technologies may have desires to test not only for whether their technologies operate without error, but may also have desire to test how their technologies operate in error situations. Current testers and emulators do not provide, or provide inadequate, test capabilities for testing error cases.

Therefore, there is a need for new and easy to use apparatus and techniques for emulating various electronic devices to verify whether other devices that are configured to interactively operate with the electronic devices operate properly.

BRIEF SUMMARY OF THE INVENTION

The present invention provides apparatus and techniques for testing computing devices, and more particularly provides embodiments for a device emulator configured to emulate one or more electronic devices that operate according to one or more Universal Serial Bus (USB) specifications to test a computing device, the computing device's device driver, the computing device's USB controller, and/or the interaction of the computing device with the device driver and/or the USB controller. The electronic devices that are emulated by the device emulator are configured to operatively couple to the computing devices, and the device emulator is similarly configured to operatively couple to the computing devices to test the operability of computing devices with the electronic devices. The device emulator is configured to provide conditional responses to requests issued from the computing devices to the device emulator.

According to one embodiment a device emulator includes a plurality of read-write registers that are selectively user configurable to include a set of read registers and a set of write registers, wherein the set of write registers are configured to receive a plurality of requests from the computing device, and wherein the set of read registers are configured to transfer one or more conditional responses of a plurality of conditional responses to the computing device based on the requests; a set of control logic configured to receive the requests from the set of write registers and transfer the conditional responses to the set of read registers; and a circuit device that includes the read-write registers and the set of control logic, wherein the circuit device is configured to operate the control logic to emulate the electronic device.

According to a specific embodiment, the control logic is configured to rewrite the set of read registers with one or more of the conditional responses based on the requests being received from the computing device. According to another specific embodiment, the control logic is configured to rewrite the set of read registers with one or more of the conditional responses based on the requests being received by the write registers. According to yet another specific embodiment, the control logic is configured to rewrite the set of read registers during an emulation of the electronic device. According to a further specific embodiment, the control logic is configured to rewrite the set of read registers during an emulation of the electronic device. The circuit device may be a field programmable gate array. In one embodiment, the control logic is user programmable.

According to another embodiment a method is provided for testing the operability of a computing device with a universal serial bus (USB) device emulator that is configured to operatively couple to the computing device to emulate an electronic device that is configured to operatively couple to the computing device and operate according to at least one USB specification. The method includes receiving at the device emulator a request from the computing device; transmitting, in real time, at least one conditional response, which is responsive to the received request, from the device emulator to the computing device; receiving in the computing device the conditional response; the computing device generating a response to the received conditional response; and determining whether the response is a correct response. In a specific embodiment, this method further includes repeating the first mentioned receiving step, the transmitting step, the second mentioned receiving step, the generating step, and the determining step for a plurality of requests; and rewriting a read register with a plurality of conditional responses that respectively correspond to the plurality of received requests. In some embodiments, the method further includes receiving at the device emulator a second request from the computing device; and rewriting the contents of a read registers with a second conditional response that is responsive to the second request. According to some embodiments, the first mentioned conditional response and the second conditional response are configurable by a user.

A further understanding of the nature and advantages of the present invention may be gained by reference to the remaining portions of the specification and the drawings.

DETAILED DESCRIPTION OF THE INVENTION

The present invention provides an apparatus and technique for testing computing devices, and more particularly provides a device emulator configured to emulate one or more electronic devices that operate according to a Universal Serial Bus (USB) specification. The electronic devices that are emulated by the device emulator are configured to operatively couple to the computing devices, and the device emulator is configured to similarly operatively couple to the computing devices to test the operability of computing devices with the electronic devices. The device emulator is configured to provide conditional responses to requests issued from the computing devices to the device emulator.

Figure 1:
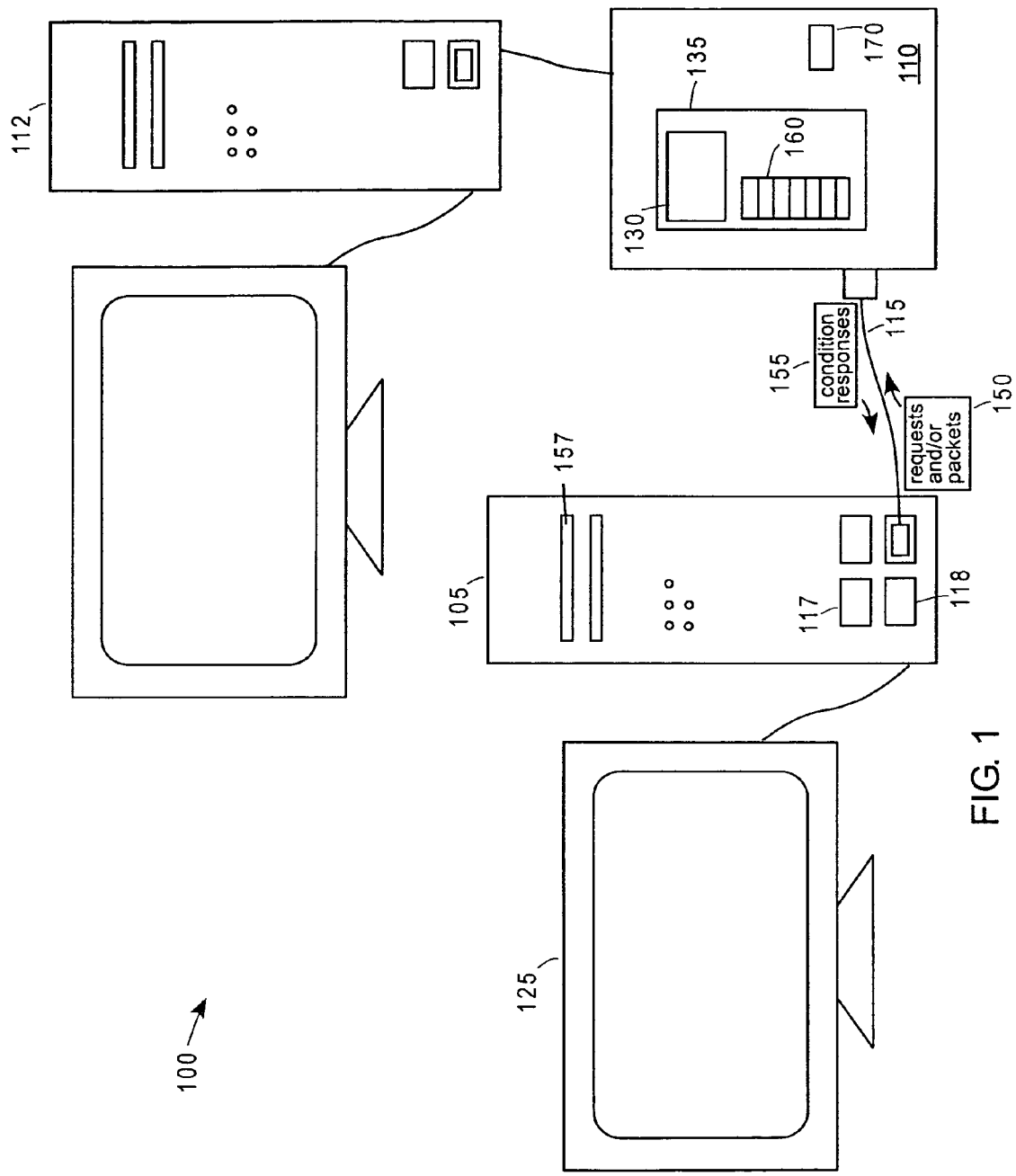
FIG. 1 is a simplified block diagram an electronic system according to an embodiment of the present invention.

FIG. 1 is a simplified block diagram an electronic system 100 according to an embodiment of the present invention. Electronic system 100 includes a computing device 105, a device emulator 110, a control device 112, and an electronic-coupling device 115 configured to operatively couple the computing device and the device emulator. Computing device 105 can be anyone of a personal computer (such as a desktop computer, a laptop computer, etc. optionally including a display 125), a server computer or the like. The computing device is configured to operatively couple to an electronic device (not shown) that might be configured to operate according a specification, such as one or more USB specifications (e.g., USB specification 1.0, 1.1, 2.0 or a USB specification in use at the time). Electronic devices configured to operate according to a USB specification are herein sometimes referred to as USB devices. The computing device might include a USB controller 117 and a set of device drivers 118 that is configured to control computer interactions with the USB controller. A set as referred to herein may include one or more element. For example, a set of device drivers may include one or more device drivers. Device drivers 118 may be a driver loaded onto the computer by a user, or might be included in the operating system of the computing device. The device drivers might include a device driver for the USB controller, a device driver for one or more USB devices configured to operate with the computing device and the USB controller, or other device drivers. The USB controller may include a USB interface configured to couple to a USB device, and provide communications between the USB controller and a USB device. As referred to herein testing the operability (including error cases) of computing device 105 includes the testing of USB controller 117 and/or device driver 118.

Control device 112 may be a computer device configured to receive commands from a user to control device emulator 110. The control device can be anyone of a personal computer (such as a desktop computer, a laptop computer, etc.), a server computer or the like. Device emulator 110 is configured to emulate a number of USB devices, such as a keyboard, a mouse, a storage device (e.g., flash memory drive), a camera, a video camera, a scanner, a printer, a plotter, a telephonic device, a personal digital assistant, a digital music player (such as an MP3 player) or the like. While electronic-coupling device 115 is shown as a cable device, the electronic-coupling device might include any device configured to couple computing device 105 and device emulator 110. Those of skill in the art will know of a number of coupling devices configured to operatively couple computing device 105 and a device emulator 110.

According to one embodiment, device emulator 110 is configured to implement a set of control logic 130 that is configured to operate on a logic device 135, such as a field programmable gate array (FPGA). While embodiments of control logic 130 are described herein as being configured to operate on an FPGA, the control logic might alternatively be configured to operate on an application specific device, a microcontroller, a microprocessor, a combination of the foregoing devices or the like. As control logic 130 is configured to operate on FPGA 135, the control logic is configured to operate in "real time." That is, the device emulator is configured to operate at substantially the same rate as the USB devices that are emulated by the device emulator.

According to one embodiment, at least a portion of control logic 130 is user-programmable control logic. The user-programmable control logic might be entered on control device 112, computing device 105 (or other computing device) using the program interface (e.g., graphical user interface) of a program running on the computing device. The computing device may be configured to load the user-programmable control logic into FPGA 135 for execution during device emulation. According to one embodiment, subsequent to loading the user-programmable control logic into the FPGA, the device emulator is configured to emulate an electronic device. The device emulator might emulate an electronic device during an emulation session without additional control logic entered into the FPGA.

According to one embodiment, device emulator 110 is configured to recognize a set of requests (e.g., USB requests) 150 issued from computing device 105, and conditionally respond to the requests with a set of conditional responses 155 that respectively correspond to the set of requests (as referred to herein, a set may include one or more elements). That is, each request is associated with a select conditional response. Control logic 130 might be configured to respectively associate the set of requests 150 with the set of conditional responses 155. Control logic 130 might further be configured to provide that each conditional response is transmitted from the device emulator to the computing device in response to the device emulator receiving a request associated with the conditional response. The control logic might also be configured to control the storage of the conditional responses in a memory 170 and might also be configured to retrieve the conditional responses for transfer to the computing device. While memory 170 is shown in FIG. 1 as a module that is external to the FPGA, the memory may be packaged with the FPGA (e.g., in a multi-chip module), may be formed on the same die as the FPGA, may be formed from the FPGA circuitry or the like.

The set of requests 150 might be selected from a plurality of USB requests that might include requests specified by one or more USB specifications (these are often referred as USB standard requests), class specific requests, device specific requests, or user specific USB requests. Device specific requests include requests that are associated with a given device (e.g., memory, keyboard, mouse, camera, etc). Further, the USB requests might include a reset request, standard requests, class requests, device-specific requests, device-specific-class request, device-specific-device requests and the like. According to a specific embodiment, the plurality of USB requests to which the device emulator might respond in a single emulation session is thirty-one USB requests. According to another specific embodiment, the plurality of USB requests to which the device emulator might respond in a single emulation session is thirty-one device specific USB requests. In addition to the thirty-one device specific requests, the device emulator might also be configured to respond to a set standard USB requests, and a set of class requests (e.g., eight class requests). An emulation session might include the issuance of one or more requests 150 transmitted from computing device (e.g., from USB controller 117) to the device emulator and the issuance of the device emulator's conditional response to the one or more requests.

According to one embodiment, device emulator 110 includes a set of read-write registers 160 (e.g., seven registers) that might be selectively configurable by user as write registers and read resisters. That is, the number of read-write registers that are configured as write registers and the number of read-write registers configured as read registers are selectable by the user. For example, four of the read-write registers might be configured as write registers, and three of the read-write registers might be configured as read resisters, or two of the read-write registers might be configured as write registers, and five of the read-write registers might be configured as read registers. It should be understood the that forgoing described configurations of read-write registers 160 are described for illustrative purposes, and that the read-write registers might be configured by a user to include different numbers of write registers and read registers to provide conditional responses to a number of received requests.

During a device-emulation session, the read-write registers that are configured as write registers are configured to receive one or more requests (e.g., USB requests) and/or packets (e.g., USB packets) from computing device 105 (e.g., via USB controller 117). Further, the read-write registers that are configured as read registers are configured to transmit conditional responses from the device emulator 110 to computing device 105 (e.g., to USB controller 117). Control logic 130 may be configured retrieve the conditional responses from memory 170 in response to the requests received, and load the read registers with the conditional responses. The read registers may be rewritten with various conditional responses one or more times during an emulation session by the control logic.

According to one embodiment, the conditional responses might include requests (e.g., USB requests) and packets (e.g., USB packets). A request and one or more packets that are associated with the request are typically referred to as a command set. A command set might includes packets that might be directed from the computing device (e.g., from the USB controller) to the device emulator, and/or from the device emulator to the computing device (to the USB controller). According to one embodiment of the present invention, a number of command sets might be run during a device-emulation sessions. Methods for programming command sets and their associated requests and packets, according to embodiments of the present invention, are described in detail below. The structures of USB commands sets and their associated USB requests and USB packets are well known to those of skill in the art and will not be described in detail herein. A further understanding of USB architectures and protocols may be obtained from one or more of the USB Specifications (e.g., versions 1.0, 1.1, ... 1.x, 2.0, etc.) created by the USB Implementers Forum, Inc. of 5440 SW Westgate Dr., Suite 217, Portland, Oreg. 97221, USA, and which are incorporated by reference herein in their entirety.

Figure 2:
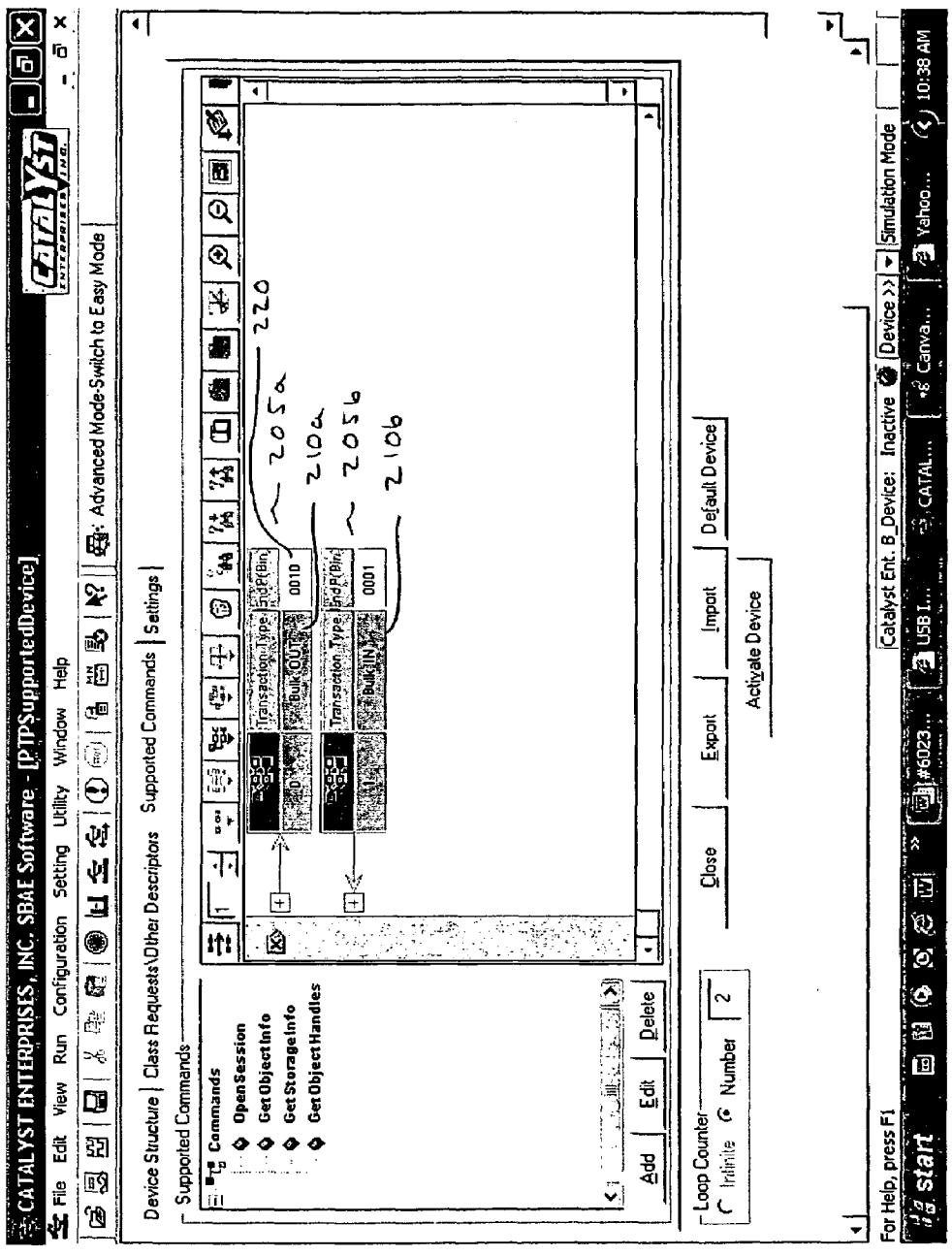
FIG. 2 is a screen image of an example graphical user interface that includes first and second command sets according to an embodiment of the present invention.
Figure 3:
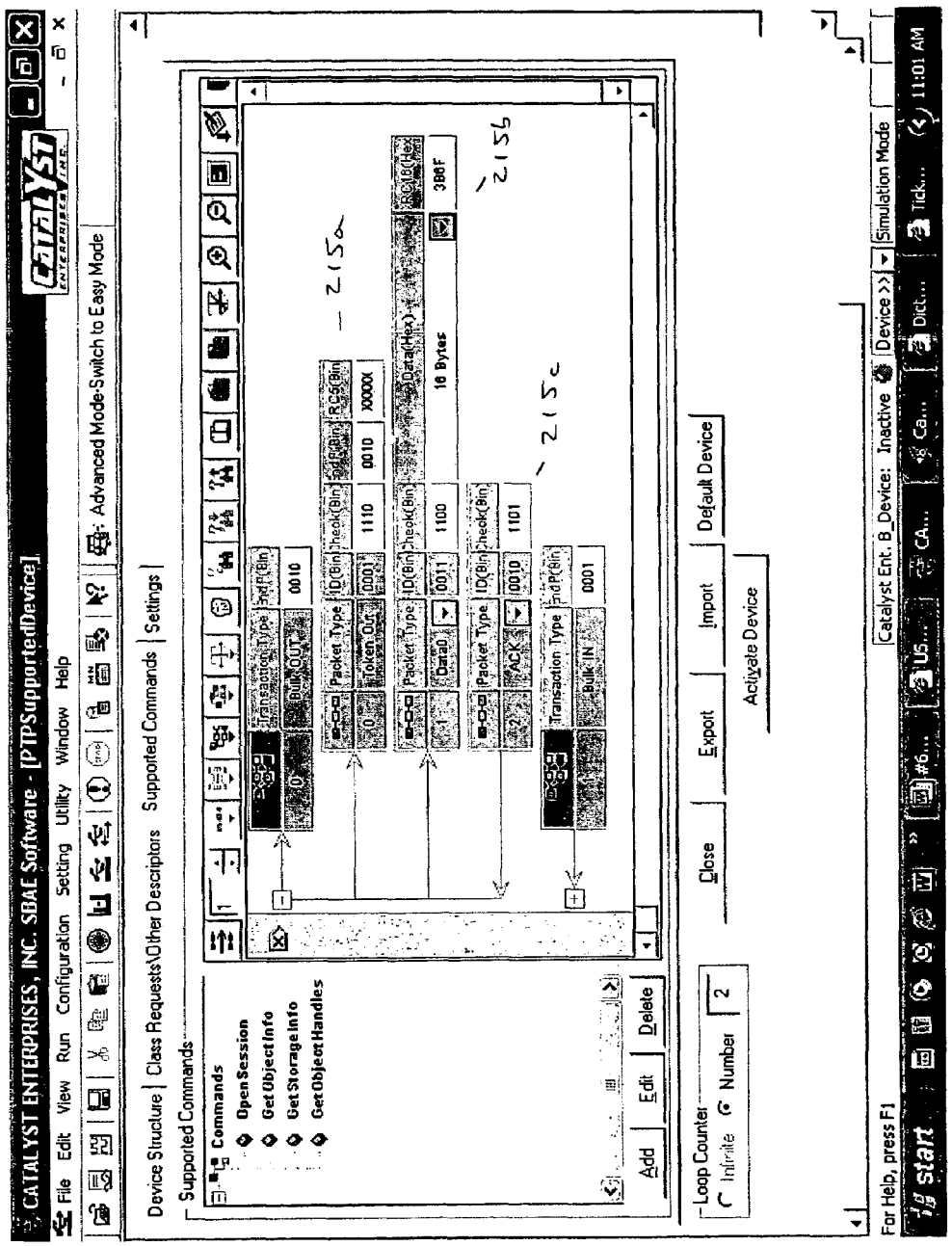
FIG. 3 is another screen image of an example graphical user interface that includes a number of packets associated with a bulk out request according to another embodiment of the present invention.
Figure 4:
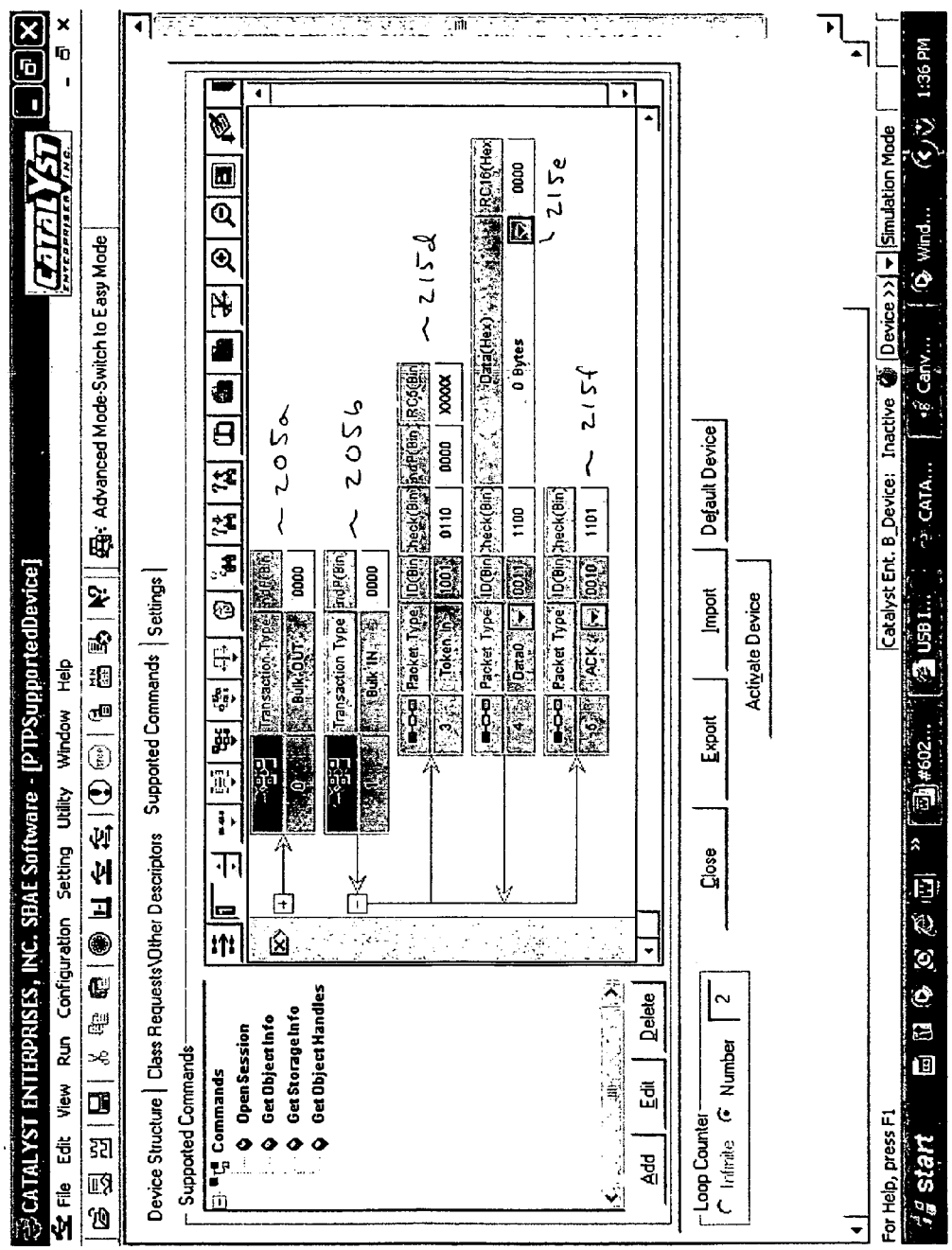
FIG. 4 is another screen image of an example graphical user interface that includes a number of packets associated with the bulk in request according to another embodiment of the present invention.
Figure 5:
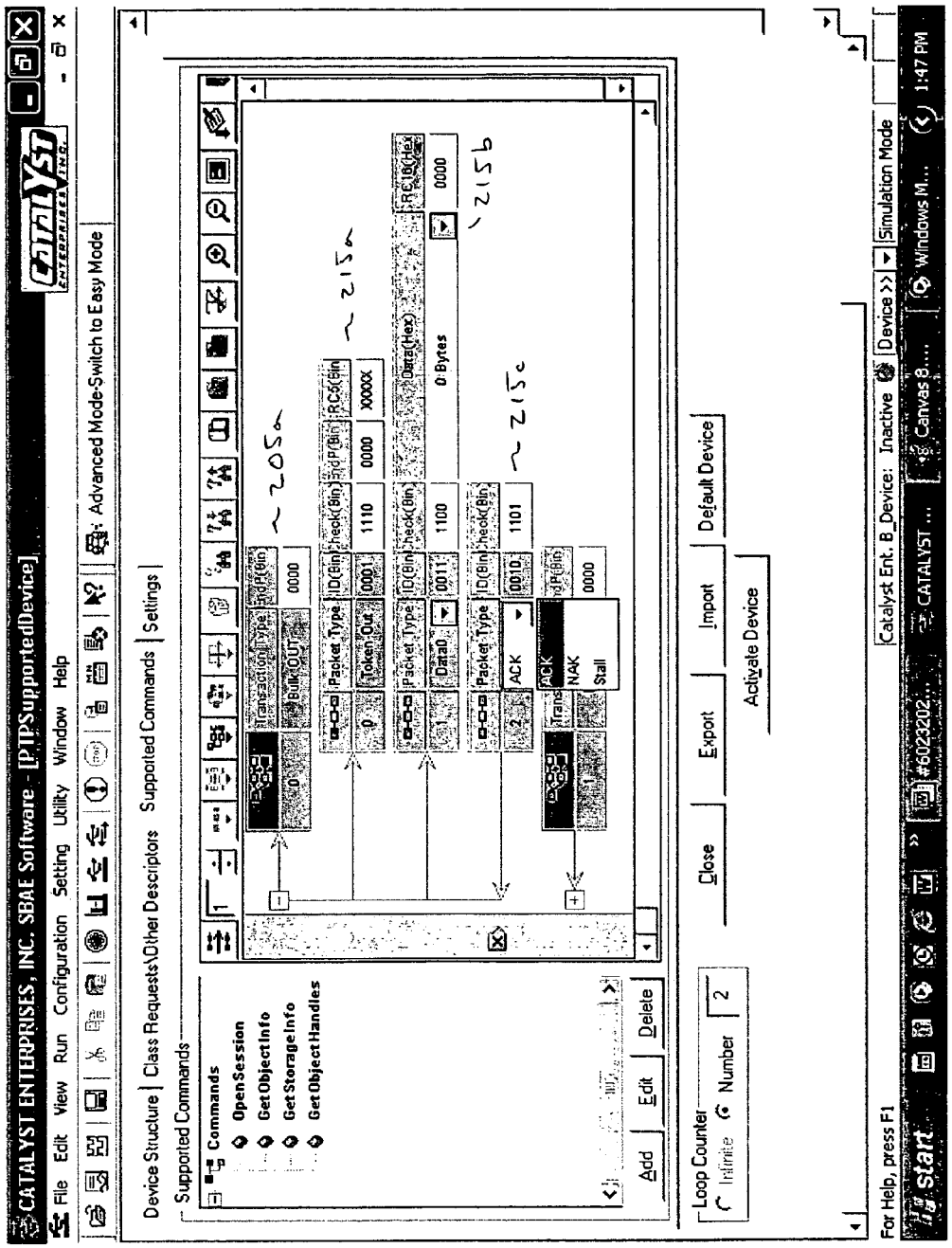
FIG. 5 is another screen image of an example graphical user interface that includes a number of example packet types that might be changed by a user to generate a conditional response to a request.

According to one embodiment, conditional responses 155 include user generated conditional responses that may be entered in FPGA 135 via a computing device, such as computing device 105, that is configured to receive the conditional responses from a user. A user might enter a set of conditional responses via a program 157 running on computing device 105, control device 112 or the like. The program can be configured to present to the user one or more windows having graphical user interfaces that may be used for entry of the conditional responses. FIG. 2 is a screen image of an example graphical user interface 200 that includes first and second command sets 205a and 205b, respectively. The requests associated with the exemplary commands sets are a bulk out request 210a and a bulk in request 210b. FIG. 3 shows a number of packets 215a, 215b, and 215c associated with the bulk out request, and FIG. 4 shows a number of packets 215d, 215e, and 215f associated with the bulk in request. Various data fields of the requests may be modified by a user to generate conditional responses as well as to control transactions between the computing device and the device emulator. For example, data field 220 of bulk out request 210a may be modified by a user. Data field 220 may include the register number (in hexadecimal) of the write register (also referred to sometimes as an endpoint) to which the bulk out request is to be directed during an emulation session. Various data fields and/or packet types of the packets may also be modified by a user to generate conditional responses to requests. For example, the acknowledge (i.e., ACK) packet type of packet 205b may be changed by a user to a not acknowledge (i.e., NAK) packet type, a stall packet type or the like (see FIG. 5).

According to another example, the data type, the check bin, the data, and/or the error check code (e.g., CRC or cyclic redundancy code) of packet 215e may be modified by a user to generate a conditional response for bulk in request 210b, which may be responsive to bulk out request 210a. It should be understood that the two command sets shown in FIGS. 2-5 are merely exemplar and that other commands sets might be configured by a user to generate conditional responses for device emulator 110 to conditionally respond to the requests of computing device 105. It should also be understood by those of skill in the art that various requests (e.g., USB requests, user specific requests, etc) and packets (e.g., USB packets, user specific packets, etc.) might have a number of associated data files, packet types and the like that may be modified by a user. Subsequent to the generation of a set of command sets, the command sets may be transferred to the device emulator for execution in an emulation session. Command sets might be transferred to the device emulator by a variety of methods such as by wire transfer or wireless transfer.

As various data (e.g., data payloads) of a command set may be modified by a user for use in emulating a device (e.g., a USB device), the user may generate conditional responses that are valid and invalid (i.e., error responses). In one embodiment, these conditional responses are used to determine whether the computing device (e.g., the USB controller and/or the set of USB device drivers) is operating according to a specified operating scheme (e.g., the USB specifications). That is, conditional responses may be used to determine whether the computing device is appropriately configured to use the valid responses and whether error-checking logic of the computing device functions correctly (e.g., according to the USB specifications) if an error response is received.

Figure 6:
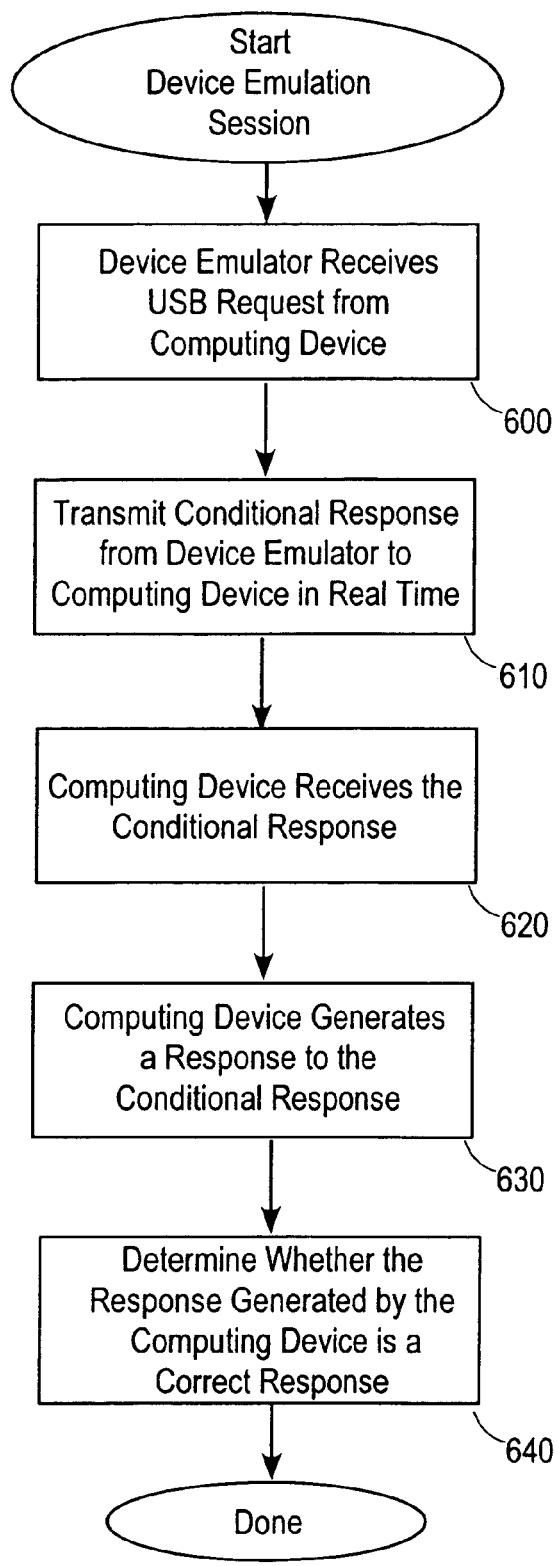
FIG. 6 is a high-level flow chart having steps for transmitting conditional responses from a device emulator to a computing device to test the operability of the computing device.

FIG. 6 is a high-level flow chart showing a process for transmitting conditional responses from a device emulator (configured to emulate a device, such as a USB device) to a computing device configured to operatively coupled to the device emulator according to one embodiment of the present invention. The conditional responses are used by the computing device to test the control logic or other systems (e.g., USB controller and/or one or more device drivers) of the computing to device to determine whether the computing device, its test logic, and or its systems function correctly in response to receiving the conditional responses. The high-level flow chart is merely exemplary, and those of skill in the art will recognize various steps that might be added, deleted, and/or modified within the spirit and purview of the present invention. At 600, a device emulator receives a USB request from a computing device. At 610, in real time, a conditional response that is conditionally responsive to the request (i.e., the conditional response is associated with the request) is transmitted from the device emulator to the computing device. At 620, the computing device receives the conditional response from the device emulator. At 630, the computing device generates a response to the conditional response. And at 640, a determination is made to whether the response generated by the computing device is a correct response. A response that is not correct indicates that the computing device is not operating properly. For example, the response might indicate that the computing device is not operating according to one or more USB specifications and might need to be modified to operate in accord with one or more USB specifications.

Figure 7:
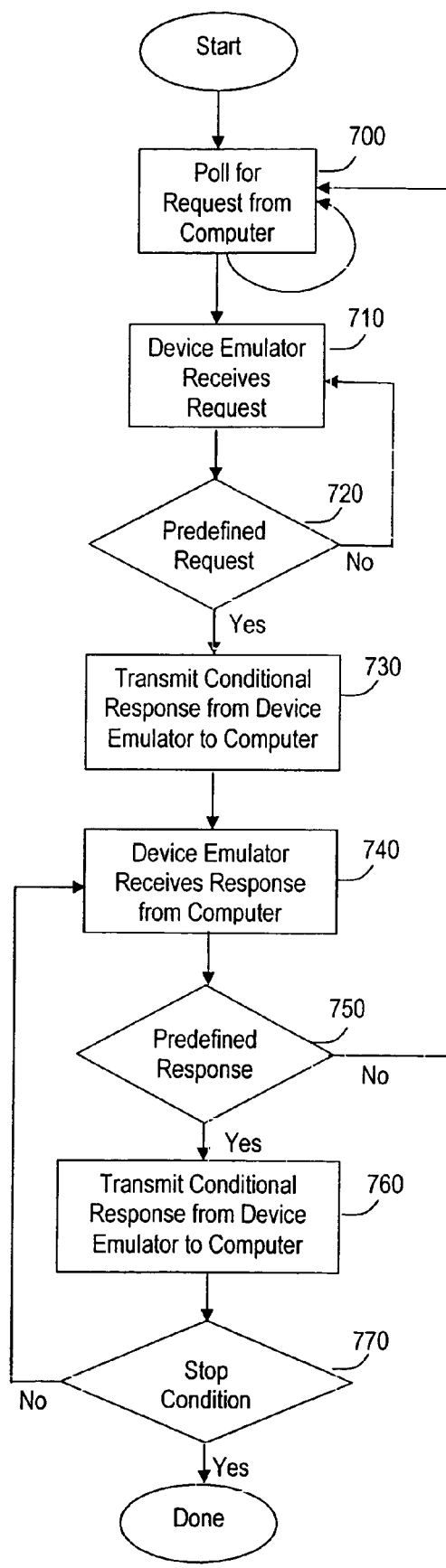
FIG. 7 is a high-level flow chart having steps for transmitting conditional responses from a device emulator to a computing device to test the operability of the computing device according to another embodiment of the present invention.

FIG. 7 is a high-level flow chart showing a process for transmitting conditional responses from a device emulator (configured to emulate a device, such as a USB device) to a computing device configured to operatively coupled to the device emulator according to another embodiment of the present invention. The conditional responses are used by the computing device to test the control logic or other systems (e.g., USB controller and/or one or more device drivers) of the computing to device to determine whether the computing device, its control logic, and its systems function correctly in response to receiving the conditional responses. The high-level flow chart is merely exemplary, and those of skill in the art will recognize various steps that might be added, deleted, and/or modified within the spirit and purview of the present invention. At 700, the device emulator polls (e.g., periodically checks) one or more of the read/write buffers that are configured as read buffers for receipt of a request, such as a USB request. If a request is received (step 710), the request is checked (step 720) by the device emulator whether the request is one of a set of predetermined requests (e.g., thirty-one device specific requests, standard requests, eight class requests) the device emulator is configured to respond to. If the device emulator is not configured to provide a conditional response to the request, the device emulator might continue polling one or more of its read buffers for a request to which the device emulator is configured to provide a conditional response. Alternatively, if the device emulator is configured to provide a conditional response to the request, the conditional response to sent to the computing device, step 730. The conditional response is transmitted from the device emulator to the computing device in real time. The conditional response might be an error response configured to test the operability and response of the computing device (e.g., the computing device's USB controller, device driver, etc.) to the error response.

At 740, the computing device transmits a response to the device emulator's conditional response. This response from the computing device may be checked by the device emulator (step 750) to determine whether this response is a response to which the device emulator is configured to respond. If the device emulator is not configured to respond to this response, the device emulator may return to step 700 to continue polling for new requests to which the device emulator is configured to provide responses. According to one embodiment, this response is trapped by device emulator for analysis by a user to determine, for example, whether this response is a correct response (e.g., in accordance with the USB specifications), for example, to an error response issued by the device emulator. If the device emulator is configured to respond to this response, the device emulator may send another conditional response at step 760. Steps 740, 750 and 760 may be repeated until a stopping condition is satisfied at step 770.

It is to be understood that the examples and embodiments described above are for illustrative purposes only and that various modifications or changes in light thereof will be suggested to persons skilled in the art and are to be included within the spirit and purview of this application and scope of the appended claims. For example, while conditional responses have been described above as being user generated, the control logic of the FPGA or other circuitry or software (e.g., software running on the computing system) might be configured to generate conditional responses to requests. Moreover, while the device emulator has been described as being configured to emulate USB devices, the device emulator might be configured to emulate device that operate according to other protocols. Therefore, the above description should not be taken as limiting the scope of the invention as defined by the claims.

What is claimed is:

1. A device emulator configured to emulate an electronic device, such that the device emulator is configured to test a computing device configured to operatively couple to the device emulator and the electronic device emulated by the device emulator, the device emulator comprising:

a plurality of read-write registers that are selectively user configurable to include a set of read registers and a set of write registers, wherein the set of write registers are configured to receive a plurality of requests from the computing device, and wherein the set of read registers are configured to transfer one or more conditional responses of a plurality of conditional responses to the computing device based on the requests, and wherein the conditional responses emulate responses that would be provided by the emulated electronic device when coupled to the computing device;

a set of control logic configured to receive the requests from the set of write registers and transfer the conditional responses to the set of read registers, and to rewrite the set of read registers with one or more of the conditional responses based on the requests being received from the computing device; and a circuit device that includes the read-write registers and the set of control logic, wherein the circuit device is configured to operate the control logic to emulate the electronic device.

2. The device emulator of claim 1, wherein the control logic is configured to rewrite the set of read registers with one or more of the conditional responses based on the requests being received by the write registers.

3. The device emulator of claim 1, wherein the control logic is configured to rewrite the set of read registers during an emulation of the electronic device.

4. The device emulator of claim 1, wherein the circuit device is a field programmable gate array.

5. The device emulator of claim 1, wherein the control logic is user programmable.

6. The device emulator of claim 1, wherein the device emulator is configured to emulate an electronic device that is configured to operate according to at least one universal serial bus specification.

7. The device emulator of claim 1, wherein the requests are universal serial bus requests.

8. The device emulator of claim 1, wherein the plurality of requests includes thirty-one device specific requests.

9. The device emulator of claim 8, wherein the plurality of requests includes standard requests.

10. The device emulator of claim 8, wherein the plurality of requests includes a set of class requests.

11. The device emulator of claim 1, wherein the conditional responses include error responses.

12. The device emulator of claim 1, wherein the set of control logic is configured to rewrite the conditional responses in the read registers with replacement-conditional responses in response to another received from the computing device, and wherein the read registers are configured to transfer the replacement-conditional responses to the computing device in response to the other-request.

13. The device emulator of claim 12, wherein the other request is the same as at least one of the first mentioned requests.

14. The device emulator of claim 1, wherein the conditional responses are respectively associated with the requests.

15. The device emulator of claim 1, wherein the read-write registers and the control logic are user configurable to selectively emulate a plurality of electronic devices.

16. The device emulator of claim 1, wherein the circuit device is configured to provide the conditional responses in real time to the computing device as the requests are received.

17. The device emulator of claim 1, wherein the computing device is at least one of a personal computer and a server.

18. The device emulator of claim 1, wherein the device emulator is configured to emulate an electronic device, such that the device emulator is configured to test a USB controller of the computing device.

19. The device emulator of claim 1, wherein the device emulator is configured to emulate an electronic device, such that the device emulator is configured to test a device driver of the computing device.

20. A method for testing the operability of a computing device and a universal serial bus (USB) controller included in the computing device with a USB device emulator that is configured operatively couple to the computing device to emulate an electronic device that is configured to operatively couple to the computing device and operate according to at least one USB specification, the method comprising:

receiving at the device emulator a request from the computing device;

transmitting, in real time, at least one conditional response, which is responsive to the received request, from the device emulator to the computing device, wherein the conditional response emulates a response that would be provided by the emulated electronic device when coupled to the computing device;

receiving in the computing device the conditional response;

the computing device generating a response to the received conditional response;

determining whether the response is a correct response;

repeating the first mentioned receiving step, the transmitting step, the second mentioned receiving step, the generating step, and the determining step for a plurality of requests; and rewriting a read register with a plurality of conditional responses that respectively correspond to the plurality of received requests.

21. The method of claim 20, wherein the transmitting step includes transmitting the conditional response from a read register.

22. The method of claim 21, further comprising:

receiving at the device emulator a second request from the computing device; and rewriting the contents of a read registers with a second conditional response that is responsive to the second request.

23. The method of claim 21, wherein the first mentioned conditional response and the second conditional response are configurable by a user.

24. The method of claim 20, wherein the request is a universal serial bus (USB) request, and wherein the conditional response includes at least one of a USB request and a USB packet.

25. The method of claim 20, wherein the conditional response includes a USB packet that includes as a packet type a data field that is configurable by a user.

26. A method for testing the operability of a universal serial bus (USB) controller using a USB device emulator that is configured to operatively couple to the USB controller to emulate an electronic device that is configured to operatively couple to the USB controller and operate according to at least one USB specification, the method comprising:

receiving at the device emulator a request from the USB controller;

transmitting, in real time, at least one conditional response, which is responsive to the received request, from the device emulator to the USB controller, wherein the conditional response emulates a response that would be provided by the emulated electronic device when coupled to the USB controller;

receiving in the USB controller the conditional response;

the USB controller generating a response to the received conditional response;

determining whether the response is a correct response;

repeating the first mentioned receiving step, the transmitting step, the second mentioned receiving step, the generating step, and the determining step for a plurality of requests; and rewriting a read register with a plurality of conditional responses that respectively correspond to the plurality of received requests.

27. The method of claim 26, wherein the transmitting step includes transmitting the conditional response from a read register.

28. The method of claim 27, further comprising:

receiving at the device emulator a second request from the USB controller; and rewriting the contents of a read registers with a second conditional response that is responsive to the second request.

29. The method of claim 27, wherein the first mentioned conditional response and the second conditional response are configurable by a user.

30. The method of claim 26, wherein the request is a universal serial bus (USB) request, and wherein the conditional response includes at least one of a USB request and a USB packet.

31. The method of claim 26, wherein the conditional response includes a USB packet that includes as a packet type a data field that is configurable by a user.

32. A device emulator configured to emulate an electronic device, such that the device emulator is configured to test a universal serial bus (USB) controller configured to operatively couple to the device emulator and the electronic device emulated by the device emulator, the device emulator comprising:

a plurality of read-write registers that are selectively user configurable to include a set of read registers and a set of write registers, wherein the set of write registers are configured to receive a plurality of requests from the USB controller, and wherein the set of read registers are configured to transfer one or more conditional responses of a plurality of conditional responses to the USB controller based on the requests, wherein the conditional response emulates a response that would be provided by the emulated electronic device when coupled to the USB controller;

a set of control logic configured to receive the requests from the set of write registers and transfer the conditional responses to the set of read registers and to rewrite the set of read registers with one or more of the conditional responses based on the requests being received from the USB controller; and a circuit device that includes the read-write registers and the set of control logic, wherein the circuit device is configured to operate the control logic to emulate the electronic device.

33. The device emulator of claim 32, wherein the control logic is configured to rewrite the set of read registers with one or more of the conditional responses based on the requests being received by the write registers.

34. The device emulator of claim 32, wherein the control logic is configured to rewrite the set of read registers during an emulation of the electronic device.

35. The device emulator of claim 32, wherein the plurality of requests includes at least thirty-one device specific requests.

36. The device emulator of claim 35, wherein the plurality of requests includes standard requests.

37. The device emulator of claim 35, wherein the plurality of requests includes a set of class requests.

38. The device emulator of claim 32, wherein the conditional responses include error responses.

39. The device emulator of claim 32, wherein the read-write registers and the control logic are user configurable to selectively emulate a plurality of electronic devices.

40. The device emulator of claim 32, wherein the circuit device is configured to provide the conditional responses in real time to the USB controller as the requests are received.

* * * * *